United States Patent
Gopalakrishnan et al.

(10) Patent No.: US 9,239,830 B2
(45) Date of Patent: Jan. 19, 2016

(54) SYSTEM AND METHOD FOR BUILDING RELATIONSHIP HIERARCHY

(71) Applicant: XURMO TECHNOLOGIES PVT. LTD., Banaglore (IN)

(72) Inventors: Sridhar Gopalakrishnan, Bangalore (IN); Sujatha Raviprasad Upadhyaya, Bangalore (IN)

(73) Assignee: XURMO TECHNOLOGIES PVT. LTD., Karnataka (IN)

( * ) Notice: Subject to any disclaimer, the term of this patent is extended or adjusted under 35 U.S.C. 154(b) by 323 days.

(21) Appl. No.: 13/755,062

(22) Filed: Jan. 31, 2013

(65) Prior Publication Data

US 2014/0046877 A1    Feb. 13, 2014

(51) Int. Cl.
*G06N 5/00* (2006.01)
*G06F 1/00* (2006.01)
*G06F 17/28* (2006.01)
*G06F 17/30* (2006.01)
*G06N 99/00* (2010.01)
*G06N 5/02* (2006.01)
*G06F 17/27* (2006.01)

(52) U.S. Cl.
CPC ............. *G06F 17/28* (2013.01); *G06F 17/278* (2013.01); *G06F 17/30539* (2013.01); *G06F 17/30604* (2013.01); *G06F 17/30705* (2013.01); *G06F 17/30734* (2013.01); *G06N 5/02* (2013.01); *G06N 99/005* (2013.01)

(58) Field of Classification Search
CPC ........... G06N 5/04; G06N 5/02; G06N 5/048; G06Q 50/01
See application file for complete search history.

(56) References Cited

U.S. PATENT DOCUMENTS

| | | |
|---|---|---|
| 2004/0256152 A1* | 12/2004 | Dashevskiy et al. ............ 175/25 |
| 2007/0011134 A1* | 1/2007 | Langseth et al. ................. 707/1 |
| 2013/0290343 A1* | 10/2013 | Kruglick ...................... 707/741 |

* cited by examiner

*Primary Examiner* — Jeffrey A Gaffin
*Assistant Examiner* — Kalpana Bharadwaj
(74) *Attorney, Agent, or Firm* — Barry Choobin; Patent 360 LLC

(57) ABSTRACT

The various embodiments herein provide a method and system for building a relationship hierarchy from big data. The method comprises extracting a plurality of relationships defined between entities from a big data, building relationship recognition models adapted to identify different forms of generic relationships, resolving the relationships by grouping the similar relationships together and separating the relationships which are syntactically and semantically dissimilar and reconciling the resolved relationships to build the relationship hierarchy. The relationship hierarchy comprises groups and subgroups of relationships created based on generic relationship similarity based on a contextual aspect and a specialization aspect using a Language and Domain model. The method of extraction of plurality of relationships from the unstructured data is a self-learning process which uses open information extraction techniques for learning new relationships.

9 Claims, 4 Drawing Sheets

SYSTEM AND METHOD FOR BUILDING RELATIONSHIP HIERARCHY

CROSS-REFERENCE TO RELATED APPLICATION

The present application claims priority of Indian provisional application serial number 3286/CHE/2012 filed on Aug. 10, 2012, and that application is incorporated in its entirety at least by reference.

BACKGROUND

1. Technical Field

The embodiments herein generally relate to data mining and particularly relates to extracting and resolving relationships from a large collection of data. The embodiments herein more particularly relates to a method and system for building a relationship hierarchy from the extracted relationships.

2. Description of the Related Art

The big data is a large collection of information which derives its data content from a plurality of structured, unstructured and semi-structured data sources. The big data calls for paradigm shift in the way the data is looked at in the past. Data cannot anymore reside in pockets and cannot talk to each other. It is imperative that data should be processed by considering all of it as one. Recognizing the entities and the relationships the entities share is a first step toward understanding big data.

An entity is an unit of data which has an independent existence and is also referred as an object that makes an independent sense. A relationship describes an association between two or more entities. The relationship between two or more entities helps in understanding the characteristics and behavior of the entities. In a database context, the entities and relationships help in structurally storing the contents of data. While relationships are rather explicit in structured data, it is much implicit in unstructured data.

Identifying relationships in text data itself is a fairly complex problem and requires multi stage resolution techniques to come-up with fairly semantically resolved relationships. These resolutions can be at the grammar level such as resolution of anaphora or even at a contextual level specific to domain. However, these relationships need to be further resolved into generic groups of similar relationships and a hierarchy among relationships must be established in order to bring out the implied inferences while querying.

The existing technology discusses relationship extraction by either Natural language processing (NLP) techniques or by Machine Learning (ML). Both of the NLP and ML techniques are not self-learning and require human intervention. The ML models require preparation of tagged data for training. Ideally separate models need to be built for identifying each type of relationships. This necessitates that the number and types of relationships are first zeroed-in and work within that limited space. The open information extraction models on the other hand find infinite number of relationships where different segments of the sentences are parsed and the involved entities are identified along with suggesting relationship between them. However, this leads to many forms of the same relationships and so in-numerous unresolved relationships.

Hence, there is a need for a system and method for building a relationship hierarchy which provide accurate response to a query from a big data. Further, there is a need for a method and system for relationship extraction and resolution without any human intervention. Moreover there is a need for a method and system for resolving relationships using NLP techniques.

The above mentioned shortcomings, disadvantages and problems are addressed herein and which will be understood by reading and studying the following specification.

SUMMARY

The primary object of the embodiments herein is to provide a method and system for building a relationship hierarchy.

Another object of the embodiments herein is to provide a method and system for extracting relationships from collection of structured, unstructured and semi-structured data.

Another object of the embodiments herein is to provide a method and system which uses multi-stage resolution techniques for identifying semantic relationships in big data.

Another object of the embodiments herein is to provide a method and system for relationship resolution by separating the relationships that are syntactically and semantically apart.

Another object of the embodiments herein is to provide a method and system for resolving relationships from a contextual perspective.

Another object of the embodiments herein is to provide a method and system for resolving relationships from a specialization perspective.

Yet another object of the embodiments herein is to provide a method and system for extraction and resolution of relationships using domain and language models to facilitate accurate querying.

Yet another object of the embodiments herein is to provide a method and system for extracting, resolving and storing relationships from structured and unstructured data in a binary form.

These and other objects and advantages of the present embodiments will become readily apparent from the following detailed description taken in conjunction with the accompanying drawings.

The various embodiments herein provide a method for building a relationship hierarchy from big data. The method comprises extracting a plurality of relationships defined between entities from a big data, building one or more relationship recognition models adapted to identify different forms of relationships, resolving the relationships by grouping the similar relationships together and separating the relationships which are syntactically and semantically dissimilar and reconciling the resolved relationships to build the relationship hierarchy. The relationship hierarchy comprises groups and subgroups of relationships created based on generic relationship similarity based on a contextual aspect and a specialization aspect using a Language and Domain model.

According to an embodiment herein, the big data comprises structured, unstructured and semi-structured data.

According to an embodiment herein, extracting the plurality of relationships from the structured data comprises identifying relationships between one or more entities in a structured data. The plurality of relationships defined between the entities comprises a 'hasAttribute' relationship shared by a table entity with each of non-key attribute entity, a 'hasPrimarykey' relationship shared by a table entity with the primary key attribute, a 'IsInstanceOf' relationship shared by a value entity with a corresponding attribute entity, a belongsTo relationship shared by the table entity with a database entity, a 'hasAttributeName' relationship shared by the entity with respect to a primary key attribute with other attributes, a 'hasAttributeName' relationship shared by each entity with respect to a primary key value and with respect to other values in a topple, where attributeName being the name of the respective attribute, and a collection of relationships 'hasAttributeName' with respect to the primary key value entity which forms an entity by itself and shares a 'IsInstanceOf' relationship with the table entity.

According to an embodiment herein, extracting the plurality of relationships from the unstructured data is a self-learning process.

According to an embodiment herein, the self-learning process for extracting the plurality of relationships comprises obtaining a plurality of relationships from the samples drawn from big data through NLP based open information extraction models, grouping the obtained relationships under generic relationships based on similarity, creating sub-groups of the grouped relationships, tagging training sample with relationship tags to the occurrences of relationships in training samples, building relationship extraction models from the tagged training samples using one or more machine learning approaches and extracting relationships from the big data using the relationship extraction models.

According to an embodiment herein, the self-learning process for extracting the plurality of relationships further comprises providing new samples from the corpus, extracting new relationships using NLP based open information extraction models, reconciling the new relationships under at least one of the existing generic relationships or a new generic relationship, annotating training samples with the relationships extracted through the open information extraction models, creating one or more new relationship extraction models, populating the relationship extraction models with new relationship extraction models that successfully identifies new relationships, and passing the text data through new relationship recognition models to identify new relationships from data using one or more machine learning models.

According to an embodiment herein, resolving the plurality of relationships comprises grouping the similar relationships, where one or more verb based relationships are brought together on the basis of semantic distance of the words.

According to an embodiment herein, resolving the plurality of relationships further comprises separating the relationships which are syntactically and semantically dissimilar. The relationships are resolved by capturing specialization aspect of the relationships.

According to an embodiment herein, resolving the plurality of relationships comprises at least one of a word sense disambiguation technique and contextual resolution technique.

According to an embodiment herein, the relationship hierarchy is built using the language and domain models which comprise at least one of language repositories, domain ontologies and knowledge repositories in combination with natural language processing techniques.

According to an embodiment herein, extracting the plurality of relationships from semi-structured data is a combination of extracting relationships form the structured data and unstructured data.

The embodiments herein further provide a system for building a relationship hierarchy. The system comprises an open information extraction model to extract relationships form text data, a relationship resolver for resolving the plurality of relationships by grouping the similar relationships together and separating the relationships which are syntactically and semantically dissimilar, one or more relationship extraction models for identifying different forms of generic relationships and a relationship extractor for extracting a plurality of relationships defined between entities through the one or more relationship extraction models.

According to an embodiment herein, the relationship resolver comprises a relationship reconciler for grouping the plurality of relationships based on a contextual perspective and a specialization perspective and a relationship annotator to tag sample documents with relationship tags to the occurrences of all relationships grouped under a same tag.

According to an embodiment herein, the relationship resolver employs one or more Language and Domain models to conceptualize the plurality of relationships in accordance with a structured context or semi-structured context to create the relationship hierarchy.

According to an embodiment herein, the system further comprises a relationship store for storing the extracted relationships and instances of relationships extracted from data. The relationship store is further adapted to bring a big data in a unified form, store the extracted relationships, maintain instances of relationships extracted from the big data, maintain information specific to the relationship instances and provide a complete semantic representation of the relationships. The information on the relationship instances comprises a position of occurrence of the relationship in the big data, specific relationships extracted, generic relationships identified and information on entities involved in a defined relationship and the parent entities of the respective entities for mining frequent relationship instances.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1:
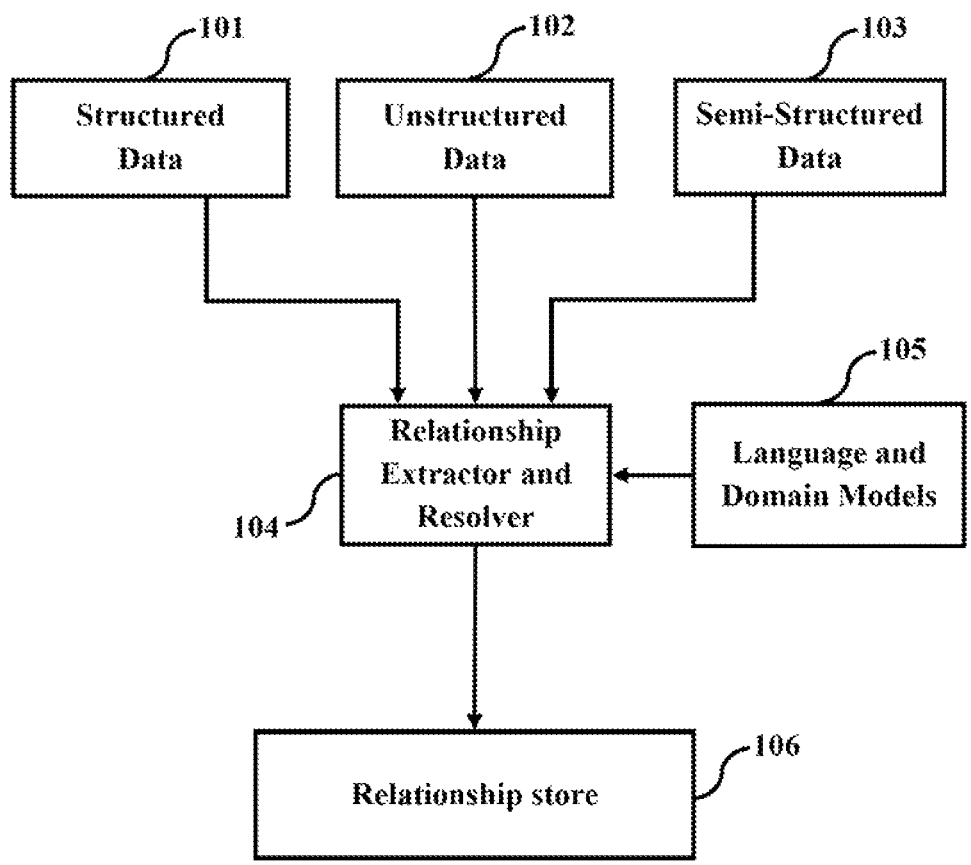
FIG. 1 is a block diagram illustrating a system for building relationship hierarchy from big data, according to an embodiment of the present disclosure.

Although the specific features of the present embodiments are shown in some drawings and not in others. This is done for convenience only as each feature may be combined with any or all of the other features in accordance with the present embodiments.

DETAILED DESCRIPTION OF THE DRAWINGS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a method for building a relationship hierarchy, the method comprises extracting a plurality of relationships defined between entities from a big data, building relationship recognition models adapted to identify different forms of generic relationships, resolving the relationships by grouping the similar relationships together and separating the relationships which are syntactically and semantically dissimilar and reconciling the resolved relationships to build the relationship hierarchy. The relationship hierarchy comprises groups and subgroups of relationships created based on generic relationship similarity based on a contextual aspect and a specialization aspect using a Language and Domain model.

The big data comprises structured, unstructured and semi-structured data.

The method of extracting the plurality of relationships from the structured data comprises identifying relationships between one or more entities in a structured data. The plurality of relationships defined between the entities comprises a 'hasAttribute' relationship shared by a table entity with each of non-key attribute entity, a 'hasPrimarykey' relationship shared by a table entity with the primary key attribute, a 'IsInstanceOf' relationship shared by a value entity with a corresponding attribute entity, a belongsTo relationship shared by the table entity with a database entity, a 'hasAttributeName' relationship shared by the entity with respect to a primary key attribute with other attributes and a 'hasAttributeName' relationship shared by each entity with respect to a primary key value and with respect to other values in a topple. The attributeName is the name of the respective attribute. The collection of relationships 'hasAttributeName' with respect to the primary key value entity forms an entity by itself and shares a 'IsInstanceOf' relationship with the table entity.

The process of extracting the plurality of relationships from the unstructured data is a self-learning process with no human intervention. The self-learning process for extracting the plurality of relationships comprises obtaining a plurality of relationships from the samples drawn from big data through NLP based open information extraction models, grouping the obtained relationships under generic relationships based on similarity, creating sub-groups of the grouped relationships, tagging training sample with relationship tags to the occurrences of relationships in training samples, building relationship extraction models from the tagged training samples using one or more machine learning approaches and extracting relationships from the big data using the relationship extraction models.

The self-learning process for extracting the plurality of relationships further comprises providing new samples that contain unidentified relationships from the corpus, extracting new relationships using NLP based open information extraction models, reconciling the new relationships under at least one of the existing generic relationships or a new generic relationship, annotating training samples with the relationships extracted through the open information extraction models, creating one or more new relationship extraction models, populating the relationship extraction models with new relationship extraction models that successfully identifies new relationships, and passing the text data through new relationship recognition models to identify new relationships from data using one or more machine learning models.

The process of resolving the plurality of relationships comprises grouping the similar relationships and separating the relationships which are syntactically and semantically dissimilar. The one or more verb based relationships are brought together on the basis of semantic distance of the words and the relationships are resolved by capturing specialization aspect of the relationships.

The resolving of the plurality of relationships uses least one of a word sense disambiguation technique and contextual resolution technique.

The relationship hierarchy is built using the language and domain models which comprise at least one of language repositories, domain ontologies, and knowledge repositories in combination with natural language processing techniques.

The process of extracting the plurality of relationships from semi-structured data is a combination of extracting relationships form the structured data and unstructured data.

The system for building a relationship hierarchy comprises an open information extraction model to extract relationships form text data, a relationship resolver for resolving the plurality of relationships by grouping the similar relationships together and separating the relationships which are syntactically and semantically dissimilar, one or more relationship extraction models for identifying different forms of generic relationships and a relationship extractor for extracting a plurality of relationships defined between entities through the one or more relationship extraction models.

The relationship resolver comprises a relationship reconciler for grouping the plurality of relationships based on a contextual perspective and a specialization perspective and a relationship annotator to tag sample documents with relationship tags to the occurrences of all relationships grouped under a same tag.

The relationship resolver employs one or more Language and Domain models to conceptualize the plurality of relationships in accordance with a structured context or semi-structured context to create the relationship hierarchy.

The system further comprises a relationship store for storing the extracted relationships and instances of relationships extracted from data. The relationship store is further adapted to bring a big data in a unified form, store the extracted relationships, maintain instances of relationships extracted from the big data, maintain information specific to the relationship instances and provide a complete semantic representation of the relationships. The information on the relationship instances comprises a position of occurrence of the relationship in the big data, specific relationships extracted, generic relationships identified and information on entities involved in a defined relationship and the parent entities of the respective entities for mining frequent relationship instances.

FIG. 1 is a block diagram illustrating a system for building relationship hierarchy from big data, according to an embodiment of the present disclosure. The big data is a collection of structured data 101, unstructured data 102 and semi-structured data 103 taken from plurality of heterogeneous data sources. The big data comprises plurality of entities and relationships between the entities. The relationships between pluralities of entities are identified and then extracted from the big data. The relationships extracted and further resolved by a relationship extractor and resolver 104. The relationship extractor and resolver 104 accumulate similar relationships under one group and separate the relationships that are syntactically and semantically apart. The relationship extractor and resolver 104 uses language and domain models 105 for efficient relationship resolution. The resolved relationships are then stored in a relationship store 106 which are further used for building a relationship hierarchy. Once relationships are extracted and resolved, they are stored in a relationship store 106. The relationship store 106 also maintains the information regarding resolution of relationships and also the specialization. The relationship resolution process is common for relationships gathered from different sources and adopts two kinds of resolutions. The first relationship resolution process involves bringing together the verb based relationships on the basis of semantic distance of the words based on contextual and word sense disambiguation (WSD). The second relationship resolution process captures the specialization aspect of relationship and eventually decides the hierarchy. The second relationship resolution process further decides the specialization by using natural language processing (NLP) techniques such as contextual resolution and WSD.

Figure 2:
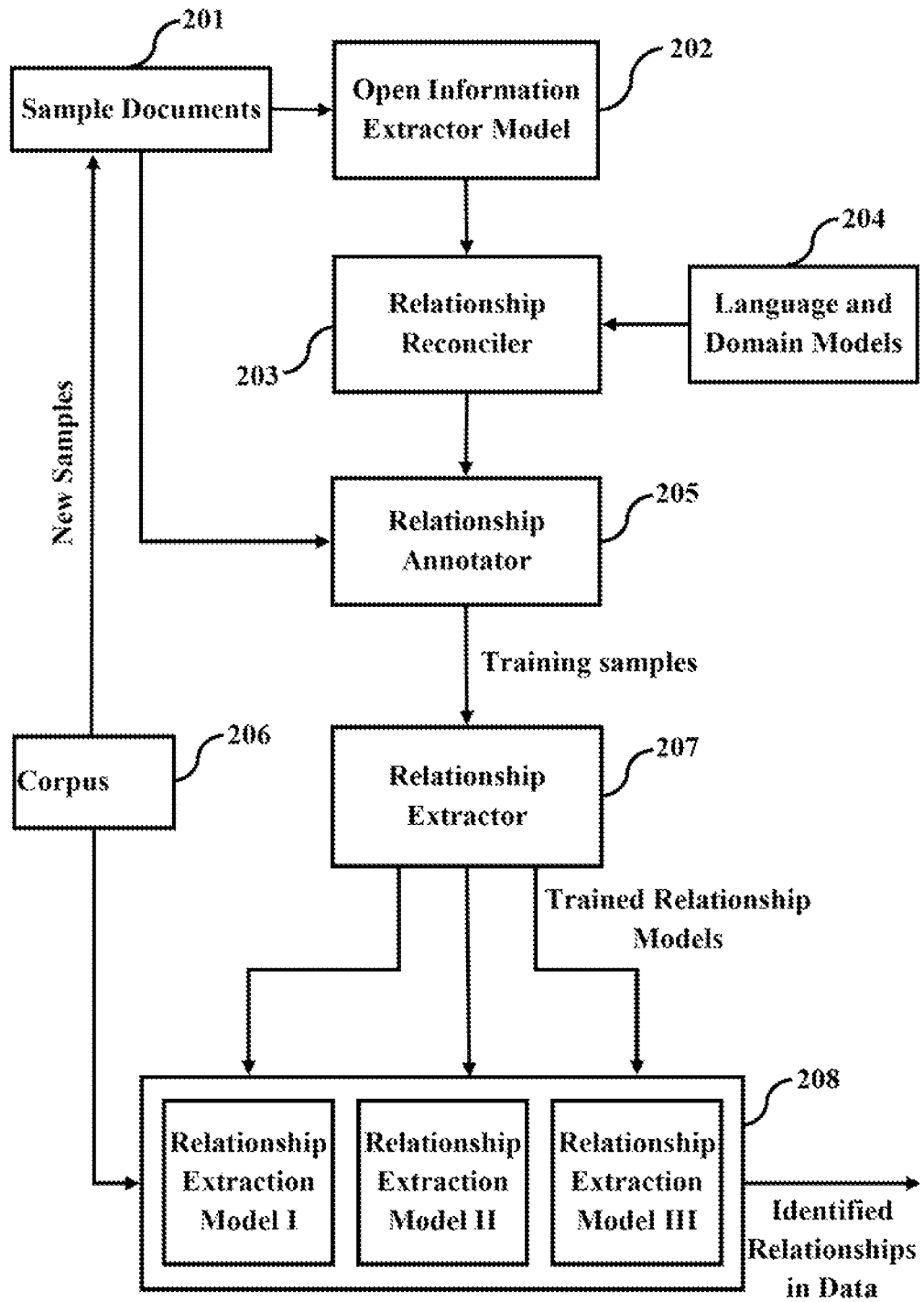
FIG. 2 is a block diagram illustrating a self-learning process for extracting relationships, according to an embodiment of the present disclosure.

FIG. 2 is a block diagram illustrating a self-learning process for extracting relationships, according to an embodiment of the present disclosure. A plurality of relationships is obtained from the sample documents 201 which are drawn from big data through open information extraction models 202. The open information extraction model 202 employs NLP based techniques to draw the relationships from big data.

The relationship reconciler 203 reconciles the obtained relationships by grouping the relationships under the most generic relationships based on the similarity. Based on requirement, subgroups of the extracted relationships are formed. The groups and subgroups form the relationship hierarchy. The relationship reconciler 203 forms groups, subgroups based on contextual and specializations using the language and domain models 204. Once the relationships are reconciled, a relationship annotator 205 is used to tag sample documents. The relationship annotator 205 tags the sample documents with generic relationship tags to the occurrences of all specific relationships grouped under the generic group. The groups, subgroups of the relationships act as training samples which then trains a relationship extractor 207 for creating trained relationship extraction models 208. Also, the tagged documents are used to build relationship extraction models 208. The relationship extraction model 208 (such as Model I, Model II and Model III) identifies and extracts the relationships in the data. The identified relationships in the data is then stored in relationship store 106. The relationship extraction models 208 are used to identify relationships contained in corpus 206. Further, if the relationships are not identified, then new sample data containing the unidentified relationships are added from the corpus 206 and corresponding new relationships are extracted. The new relationships are reconciled under existing or new generic relationships by the relationship reconciler 203. Based on the new relationships, new relationship extraction models 208 are learned and the relationships are extracted from the incoming data.

Figure 3:
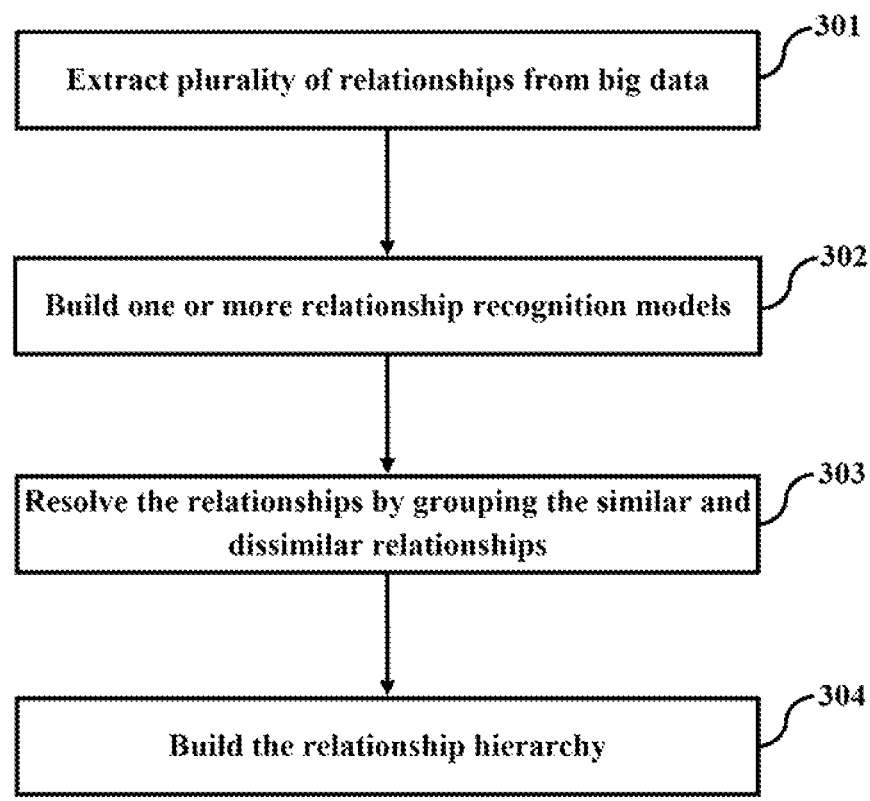
FIG. 3 is a flow chart illustrating a method for building relationship hierarchy from big data, according to an embodiment of the present disclosure.

FIG. 3 is a flow chart illustrating a method for building relationship hierarchy from big data, according to an embodiment of the present disclosure. The method comprises extracting a plurality of relationships defined between entities from a big data (301). The big data is a collection of data from structured, unstructured and semi-structured data from heterogeneous data sources. Based on the extracted relationships, one or more relationship recognition models are built, which are adapted to identify different forms of generic relationships (302). The relationships are further resolved by grouping the similar relationships together and separating the relationships which are syntactically and semantically dissimilar (303). Eventually, the resolved relationships are reconciled and a relationship hierarchy is built. The relationship hierarchy comprises groups and subgroups of relationships, which are created based on generic relationship similarity based on a contextual aspect and a specialization aspect using a Language and Domain model (304). One form of data capture is binary relationships that specify the two entities (e1, e2) involved in relationships and the relationship (r) itself.

Figure 4:
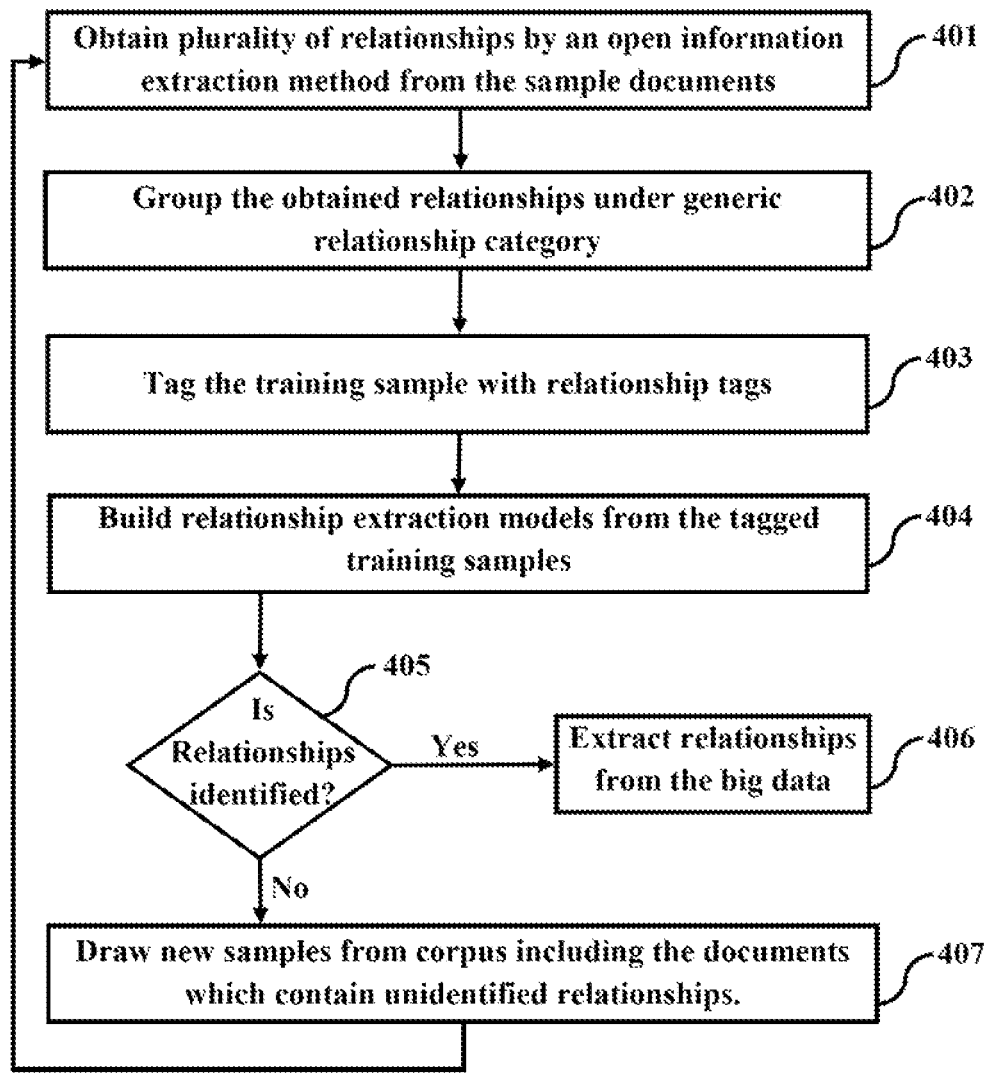
FIG. 4 is a flow chart illustrating a method for extracting relationships from unstructured data, according to an embodiment of the present disclosure.

FIG. 4 is a flow chart illustrating a method for extracting relationships from unstructured data, according to an embodiment of the present disclosure. The method of extracting relationship from unstructured data is a self-learning process. The method comprises obtaining a plurality of relationships from the samples drawn from big data through an open information extraction method (401). The resolutions are done at the grammar level such as resolution of anaphora. The obtained relationships are then grouped under generic relationships based on similarity. Also, sub-groups of the grouped relationships are created (402). Further, the training samples are tagged with relationship tags pertaining to the occurrences of relationships in training samples (403). After tagging process, the relationship extraction models are built from the tagged training samples using one or more machine learning approaches. If the relationships are identified 405, the relationships are extracted from the big data using the relationship extraction models (406). If the relationships are not identified, the new samples containing the unidentified relationships are drawn from the corpus (407). The new samples then undergo the processes (401), (402), (403), (404), (405) and (406). The process repeats when step (406) finds one or more unidentified relationships.

The embodiments of the present disclosure is a completely self-learning relationship extraction and resolution process that needs very less or no human intervention. Also, the relationship hierarchy builder helps delivering more results to help accurate querying. The embodiment of the present disclosure identifies and resolves relationships from structured and unstructured data and reconciles them together to build the relationship hierarchy. The embodiments of the present disclosure provide immense benefit in Retail, Health and Pharmaceutical services, Banking and Insurance and the like.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification.

We claim:

1. A method for building a relationship hierarchy comprises:
   obtaining a plurality of relationships from training samples drawn from big data through open information extraction models;
   grouping the obtained relationships under generic relationships based on similarity;
   creating sub-groups of the grouped relationships;
   tagging the training sample with relationship tags to the occurrences of relationships in training samples;

building relationship extraction models from the tagged training samples using one or more machine learning approaches; and providing new training samples from the big data;

extracting new relationships using natural language processing based open information extraction models;

reconciling the new relationships under at least one of the existing generic relationships or a new generic relationship;

annotating training samples with the relationships extracted through the open information extraction models;

create one or more new relationship extraction models;

populating the relationship extraction models with new relationship extraction models that can successfully identify new relationships; and passing the text data through new relationship recognition models to identify new relationships from data using one or more machine Learning models;

extract relationships from the big data using the relationship extraction models;

building relationship recognition models adapted to identify different forms of generic relationships;

resolving the relationships by grouping the similar relationships together and separating the relationships which are syntactically and semantically dissimilar; and reconciling the resolved relationships to build the relationship hierarchy, wherein the relationship hierarchy comprises groups and subgroups of relationships created based on generic relationship similarity based on a contextual aspect and a specialization aspect using a Language and Domain model.

2. The method of claim 1, wherein the big data comprises structured, unstructured and semi-structured data.

3. The method of claim 2, wherein extracting the plurality of relationships from the structured data comprises identifying relationships between one or more entities in a structured data, wherein the plurality of relationships defined between the entities comprises:

a 'hasAttribute' relationship shared by a table entity with each of non-key attribute entity;

a 'hasPrimarykey' relationship shared by a table entity with the primary key attribute;

an 'IsInstanceOf' relationship shared by a value entity with a corresponding attribute entity;

a 'belongsTo' relationship shared by the table entity with a database entity;

a 'hasAttributeName' relationship shared by the entity with respect to a primary key attribute with other attributes;

a 'hasAttributeName' relationship shared by each entity with respect to a primary key value and with respect to other values in a topple, where attributeName being the name of the respective attribute; and a collection of relationships 'hasAttributeName' with respect to the primary key value entity which forms an entity by itself and shares an 'IsInstanceOf' relationship with the table entity.

4. The method of claim 2, wherein extracting the plurality of relationships from the unstructured data is a self-learning process.

5. The method of claim 1, wherein resolving the plurality of relationships comprises grouping the similar relationships, where one or more verb based relationships are brought together on the basis of semantic distance of the words.

6. The method of claim 1, wherein resolving the plurality of relationships comprises separating the relationships which are syntactically and semantically dissimilar, where the relationships are resolved by capturing specialization aspect of the relationships.

7. The method of claim 1, wherein the resolving the plurality of relationships comprises at least one of a: word sense disambiguation technique, and contextual resolution technique.

8. The method of claim 1, wherein the relationship hierarchy is built using the language and domain models which comprise at least one of: language repositories, domain ontology, and knowledge repositories in combination with natural language processing techniques.

9. The method of claim 1, wherein extracting the plurality of relationships from semi-structured data is a combination of extracting relationships form the structured data and unstructured data.

* * * * *